Nov. 12, 1968    E. GAWRELIUK    3,410,112
SPIDER FOR FLEXIBLE COUPLING
Filed Dec. 7, 1966    2 Sheets-Sheet 1
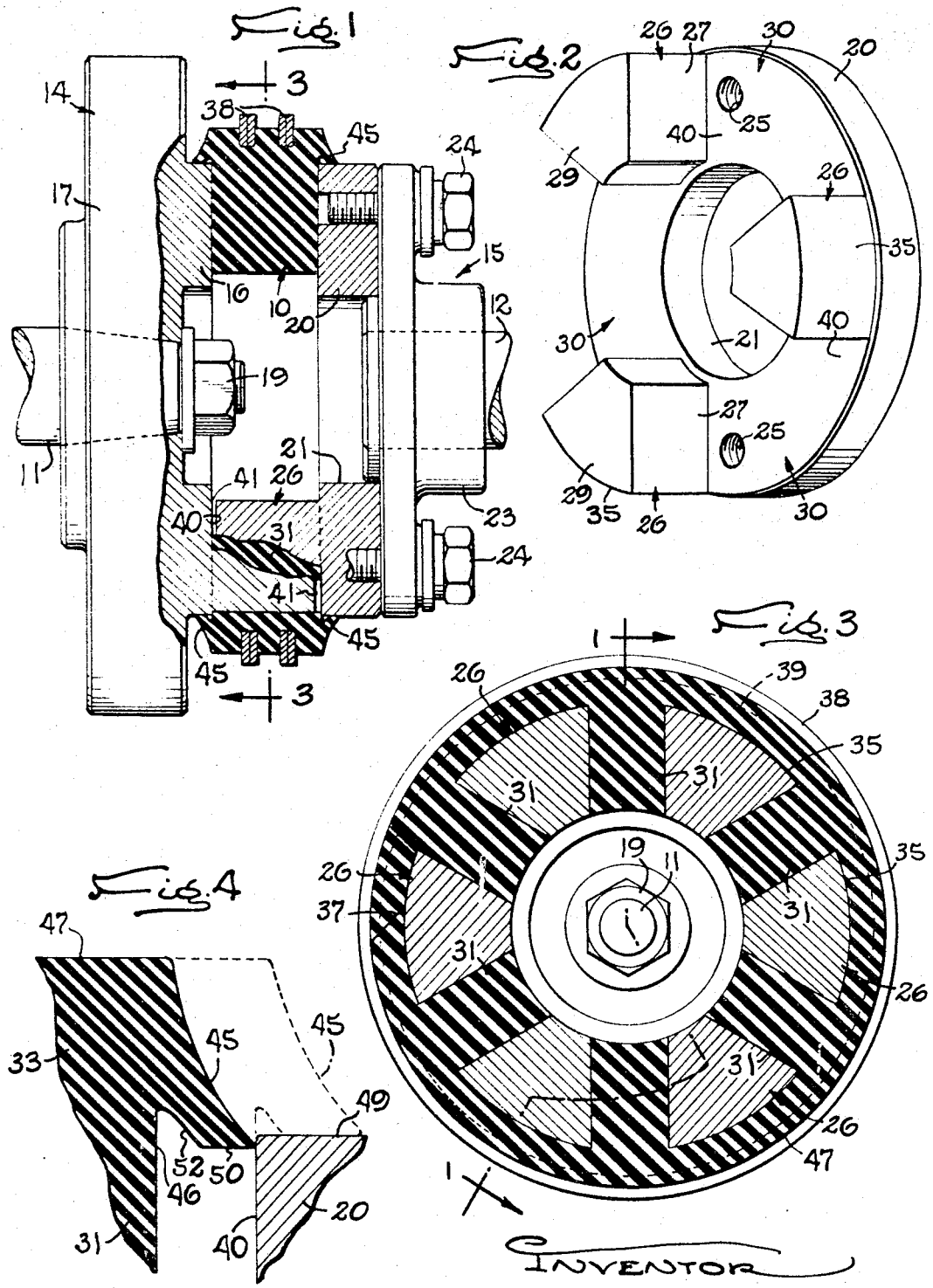
INVENTOR
Eugen Gawreliuk
by Wolfe, Hubbard, Voit & Osann
ATTORNEY Nov. 12, 1968  E. GAWRELIUK  3,410,112
SPIDER FOR FLEXIBLE COUPLING
Filed Dec. 7, 1966  2 Sheets-Sheet 2
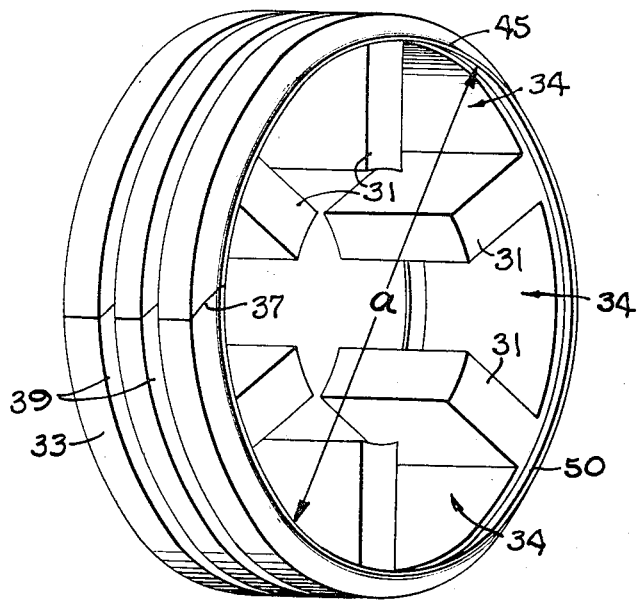
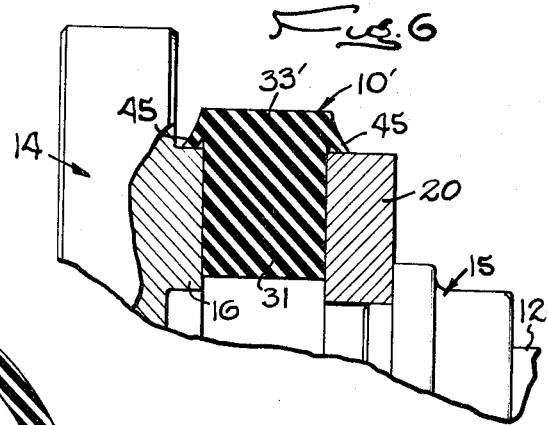
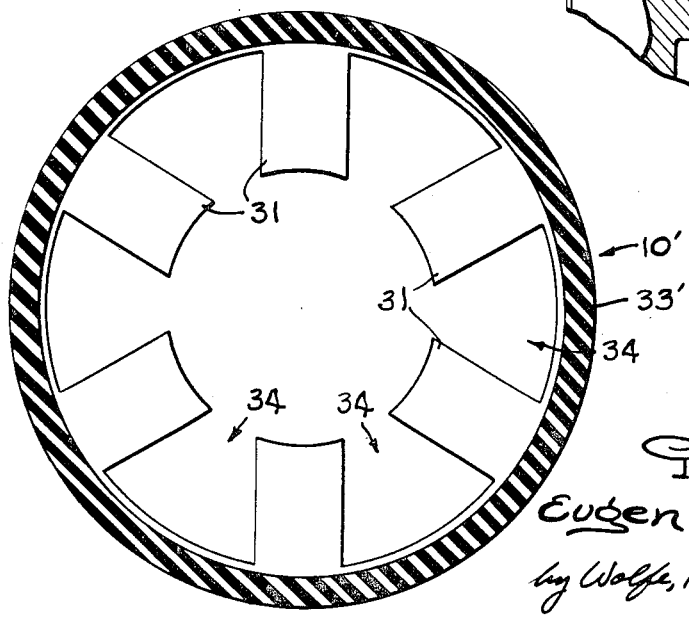
INVENTOR
Eugen Gawreliuk
by Wolfe, Hubbard, Voit & Osann
ATTORNEY ated Nov. 12, 1968

3,410,112
SPIDER FOR FLEXIBLE COUPLING
Eugen Gawreliuk, South Haven, Mich. (% Lovejoy Flexible Coupling Company, 4949 W. Lake St., Chicago, Ill. 60644)
Filed Dec. 7, 1966, Ser. No. 599,867
5 Claims. (Cl. 64—14)

ABSTRACT OF THE DISCLOSURE

A flexible coupling for connecting two rotating shafts and having a pair of heads each formed with jaws which intermesh with an intermediate spider having lugs fitting between the jaws. A peripheral ring encircles the outer ends of the lugs and is formed with resiliently yieldable lips which seal against the heads to prevent foreign particles from entering between the lugs and the jaws.

Background of the invention

This invention relates to a spider for a flexible coupling which drivingly connects two shafts disposed in end-to-end relation and transmits torque between the shafts while cushioning torsional vibration and accommodating lateral misalinement of the shafts. More particularly, the invention relates to a spider for a coupling such as shown in United States Patent No. 2,996,900 in which the spider is formed with angularly spaced lugs intermeshing with jaws projecting from each of a pair of cylindrical heads mounted on the shafts, the lugs being interconnected by a resiliently yieldable ring integral with and extending around the outer ends of the lugs.

Summary of the invention

The general object of the present invention is to provide a new and improved spider of the above character which seals against the outer surfaces of the heads to keep foreign particles from entering between the jaws and the lugs thereby to reduce abrasive wear and to increase the service life of the coupling.

A more detailed object is to form a resiliently yieldable lip on each side of the ring and to telescope the lip over the adjacent head with the lip being urged into sealing contact with the head by virtue of the resiliency of the yieldable material.

The invention also resides in the novel construction of the lip to establish an effective seal without interfering with the capability of the coupling to accommodate misalinement of the shafts.

Other objects and advantages of the invention will become apparent from the following detailed description taken in connection with the accompanying drawings.

Brief description of the drawings

FIGURE 1 is a fragmentary cross-section taken substantially along the line 1—1 of FIG. 3 and showing a coupling mounted on two shafts and having a spider embodying the novel features of the present invention.

FIG. 2 is a perspective view of one of the heads.

FIG. 3 is a fragmentary cross-section taken substantially along the line 3—3 of FIG. 1.

FIG. 4 is a fragmentary enlarged view of parts in FIG. 1 and showing the spider in an unassembled position.

FIG. 5 is a perspective view of the spider.

FIG. 6 is a fragmentary cross-section similar to FIG. 1 and showing a modified spider.

FIG. 7 is a side elevation of the modified spider.

Detailed description

As shown in the drawings for purposes of illustration, the invention is embodied in a spider 10 for a coupling which drivingly connects two end-to-end shafts 11 and 12 to transmit torque between the shafts while being capable of flexing both torsionally and laterally to accommodate relative rotation and angular and parallel misalinement between the connected shafts. For example, the shaft 11 may be power rotated by a suitable actuator (not shown) to rotate the shaft 12 and a driven device connected thereto.

In such a coupling, the spider 10 is sandwiched between and yieldably connects a pair of heads 14 and 15 mountable on the adjacent end portions of the shafts 11 and 12 for rotation with the shafts. Each head is capable of tilting slightly with respect to the other head to accommodate lateral displacement of the heads relative to each other, and also is capable of limited rotation relative to the other head through the intermediary of the spider to cushion torsional shocks produced by abrupt speed changes and to damp torsional vibration that otherwise would be transmitted through the coupling from one shaft to another.

As shown most clearly in FIG. 1, the head 14 includes a cylindrical metal disk 16 formed integrally with a relatively large hub 17 telescoped over the shaft 11 and fastened to the latter by a nut 19 threaded onto the end of the shaft. The head 15 also comprises a cylindrical disk 20 which is formed with a center bore 21 (FIG. 2) sized to telescope over the shaft 12 and which is fastened in face-to-face relation with a hub 23 by a pair of cap screws 24 extending axially through the hub and threaded into holes 25 in the disk. The hub 23 may be coupled to the shaft 12 by a set screw (not shown). Each head 14, 15 is formed with three equally spaced jaws 26 integral with the disk and projecting axially toward the other head, the working faces 27 of the jaws being disposed in generally axial planes and the end faces 29 of the jaws being disposed in generally radial planes. The jaws define three angularly spaced, axially and radially opening notches 30 (FIG. 2) around the periphery of each disk, and herein the jaws of each disk project into the notches of the other disk and thus interfit with one another as shown in FIGS. 1 and 3.

The notches 30 are of greater circumferential width than the jaws 26 thereby leaving space between the adjacent working faces 27 of the interfitting jaws for the reception of cushioning pads 31 formed on the spider 10. Herein, the cushioning pads are six angularly spaced lugs molded of relatively firm but resiliently yieldable rubber and interconnected by a circular ring 33 formed integrally with the outer end of each lug 31 and extending circumferentially between the lugs. The lugs define a series of six angularly spaced notches 34 (FIGS. 5 and 7) around the periphery of the spider with each notch being equal to or slightly smaller in circumferential width than the corresponding width of the jaws 26.

In the assembled coupling, the jaws 26 fit into the notches 34 between the spider lugs 31 while the lugs project into the spaces left between adjacent jaws. The ring 33 is disposed radially outwardly of the jaws and encircles the outer surface 35 thereof. Thus, the lugged spider holds the metal coupling heads 14 and 15 in the condition shown in FIGS. 1 and 3, but is capable of yielding to accommodate the relative movements of the heads that occur in service use. In the form of the spider 10 shown in

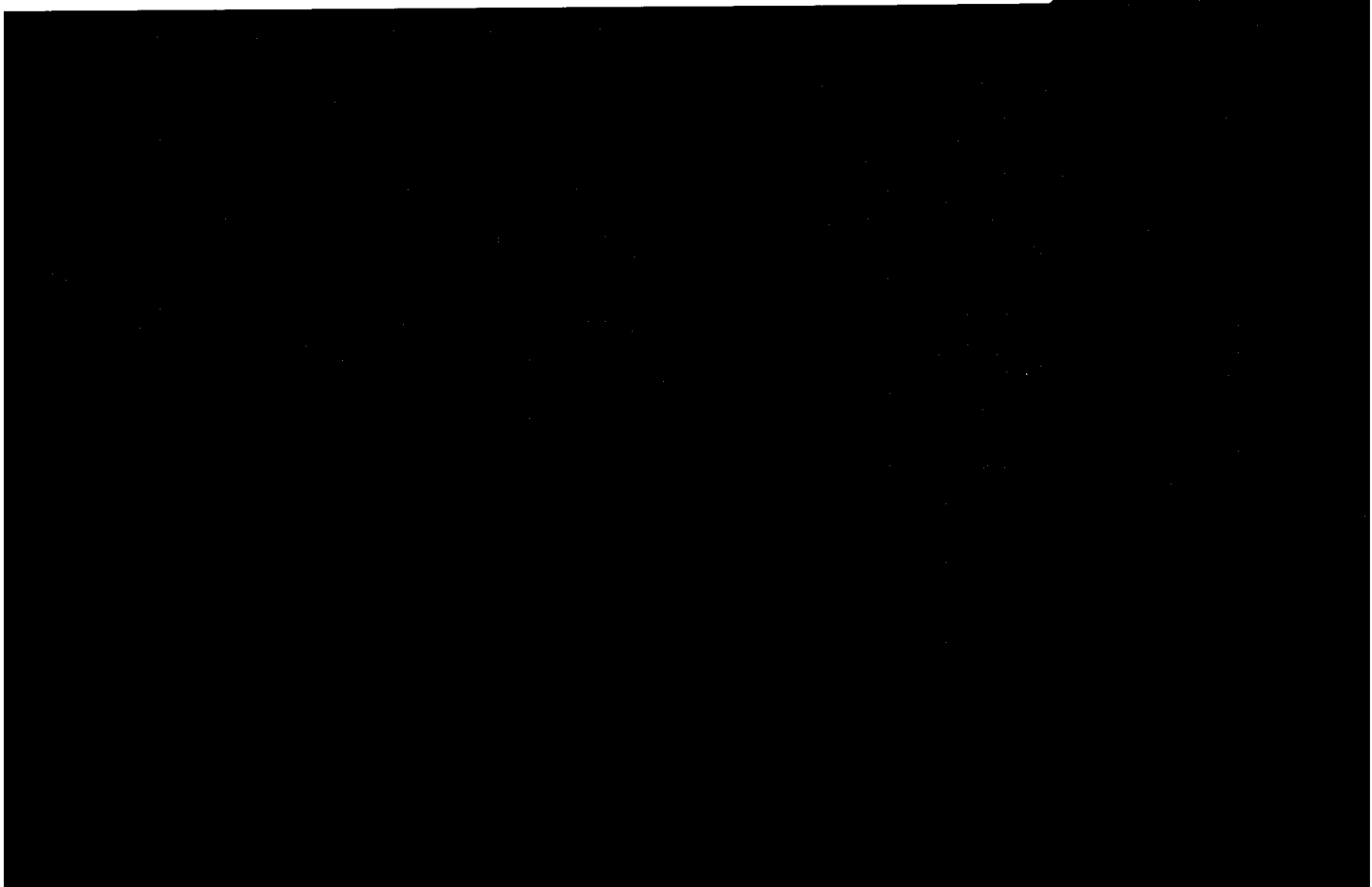

of and projecting axially away from such sides, each lip having a free end spaced radially inwardly of said outer surface and adapted to be flexed radially outwardly and thereafter urged radially inwardly by virtue of the resiliency of said material, each lip being hinged integrally to and flaring diagonally away from the adjacent side of said ring, and the free end of each lip being spaced axially from said adjacent side of said ring to form a radially and inwardly opening annular groove between said free end and said adjacent side thereby to permit radial and outward flexure of the free end.

References Cited
UNITED STATES PATENTS

| | | | |
|---|---|---|---|
| 2,655,798 | 10/1953 | Neher | 64—14 |
| 2,872,225 | 2/1959 | Walker | 64—11 X |
| 2,996,900 | 8/1961 | Fermier | 64—27 X |

FOREIGN PATENTS 1,211,675  10/1959  France.

HALL C. COE, *Primary Examiner.*